United States Patent [19]
Lee et al.

[11] Patent Number: 6,075,212
[45] Date of Patent: Jun. 13, 2000

[54] METHOD OF WEIGHING RAILROAD CARS WITHOUT UNCOUPLING THEM

[75] Inventors: Mark Alan Lee; Stephen Tremayne Gaddis, both of Green River, Wyo.

[73] Assignee: General Chemical Corporation, Parsippany, N.J.

[21] Appl. No.: 09/151,635

[22] Filed: Sep. 11, 1998

[51] Int. Cl.[7] ............................. G01G 9/00; G01G 19/52; G01G 19/00; G01G 21/22

[52] U.S. Cl. ............................. 177/145; 177/1; 177/163; 177/132

[58] Field of Search ................................. 177/145, 146, 177/161, 163, 1, 132, 133, 134, 135

[56] References Cited

U.S. PATENT DOCUMENTS

| | | | |
|---|---|---|---|
| 3,276,525 | 10/1966 | Cass | 177/163 |
| 3,367,432 | 2/1968 | Buchman | 177/163 |
| 4,094,367 | 6/1978 | Jones et al. | 177/1 |
| 4,401,175 | 8/1983 | Caldicott | 177/163 |
| 4,445,581 | 5/1984 | Caldicott | 177/163 |
| 4,904,154 | 2/1990 | Campbell et al. | 177/163 |
| 5,150,656 | 9/1992 | Lobb et al. | 104/162 |
| 5,236,337 | 8/1993 | Kikuchi et al. | 177/52 |
| 5,287,812 | 2/1994 | Lobb et al. | 104/162 |
| 5,740,843 | 4/1998 | Burkart | 177/145 |
| 5,929,387 | 7/1999 | Inglin | 177/145 |

*Primary Examiner*—Randy W. Gibson
*Attorney, Agent, or Firm*—Arthur J. Plantamura

[57] ABSTRACT

An apparatus and method for accurately weighing a rail car coupled to other rail cars without uncoupling the rail car to be weighed includes a hydraulically operated positioning device assembly with opposed pushers that can be elevated to hold the axle of a rail car uptrack of the car to be weighed, a scale mounted downtrack of the rail car positioning device, and a car stop mounted downtrack of the scale that can be elevated to block the wheels of a car downtrack of the car being weighed.

The rail car positioning device engages the car uptrack of the car to be weighed, moves the car to be weighed over the scale, and, by reversibly moving the car, centers the car over the scale. The car stop then engages the downtrack car to maintain it and other cars coupled to it downtrack in a fixed position during weighing and filling of the car on the scale. The carriage assembly then releases the car on the scale and moves uptrack where it acquires a hold on the next empty car. With the downtrack cars from the car to be weighed on the scale immobilized by the car stop, and the uptrack cars held by the reversible rail car positioning device, the uptrack cars can be moved back and forth to relieve all coupling stresses from the car to be weighed. This back and forth movement can be repeated at any time during the loading cycle to assure that coupling stresses do not influence the accuracy of the final measured cargo weight.

11 Claims, 3 Drawing Sheets

METHOD OF WEIGHING RAILROAD CARS WITHOUT UNCOUPLING THEM

This invention relates to a novel system and method for weighing and then loading individual railroad cars coupled to other rail cars. More particularly, this invention relates to a system and method for weighing and loading a rail car coupled to other rail cars without uncoupling the car, and effecting an accurate weighing operation at low cost.

BACKGROUND OF THE INVENTION

As railroad cars are loaded with a cargo, such as a liquid or solid material, they must be weighed before, during and after loading, so that a preselected amount of material can be added to each car, and to prevent overloading of the cars. The standard practice for doing this is to pull the railroad car to be weighed along a set of railroad tracks until the rail car overlies and is centered over a fixed scale mounted on the tracks. In order to give a true weight that is not influenced by pulling or pushing from adjacent cars, the car to be weighed is uncoupled from each of its adjacent cars while it is over the scale during the weighing process. When loading has been completed, the car must be re-coupled to its adjacent cars prior to moving the loaded car forward and moving the next car into position over the scale. This coupling and uncoupling adds a great deal of time and adds substantial expense to the weighing and loading of the car.

When large scale shippers, such as shippers of grain, coal and other industrial products, must weigh a large number of rail cars, the time required for uncoupling, weighing and re-coupling each rail car one at a time is very costly. Thus an alternate method has been proposed, whereby a rail car is moved across a stationary scale while remaining coupled to adjoining cars. However, in order to maintain accuracy and preclude the adjacent cars from influencing the weight of the rail car being weighed, the rail track must be absolutely level for the whole length of all of the coupled cars in order to effect this means in the prior art. Thus generally a parallel set of level tracks must be separately built alongside the main rail track line, for the length of the train, together with tracks connecting the parallel set of tracks to the main tracks at each end. This is an expensive solution, both in terms of building the level parallel tracks and in providing the space requirements for them.

Thus the present Hobson's choice of the known prior art is either to take the time to de-couple and re-couple each rail car during weighing and loading, which is very expensive in the long run, or to build a level set of parallel tracks and a new weighing facility, which may cost millions of dollars in up front costs.

Accordingly, a substantially novel and innovative method for weighing rail cars prior to and after being loaded, while avoiding some or all of the above time consumption and expense, would be highly desirable.

SUMMARY OF THE INVENTION

The present invention relates to a system for weighing a rail car coupled to one or more other rail cars without decoupling the cars. The system comprises a hydraulically operated rail car positioning device located between the rail tracks and includes a fixed scale mounted between the rail tracks downtrack from the positioning device, and a hydraulically operated car stop downtrack from the scale. The car stop is utilized to engage the wheels of the downtrack car or cars from the car to be weighed in a fixed position to prevent movement of the downtrack cars.

The method of the invention includes the following sequential steps;
a) the positioning device engages a rail car uptrack from and coupled to the car to be weighed, and moves the cars back and forth to center the car to be weighed over a fixed scale in the tracks;
b) the car stop engages the wheels of the rail car downtrack of the car to be weighed, preventing movement of it and all downtrack cars coupled to it;
c) the uptrack cars of the car to be weighed are moved back and forth by the car positioning device to relieve the stresses caused by the coupled uptrack cars on the car to be weighed;
d) the car to be weighed is weighed;
e) the weighed car is loaded;
f) the loaded car is moved back and forth to relieve any coupling stresses and a final weight is measured;
g) the car stop is retracted from the downtrack car;
h) the string of cars is moved by the rail car positioning device downtrack by one car length bringing the next car to be weighed over the fixed scale;
i) the car stop engages and stops movement of the filled car;
j) the rail car positioning device is released from the filled car and moved uptrack;
k) the rail car positioning device engages the next rail car uptrack of the car to be weighed.

Thus the reversible rail car positioning device moves a rail car to be weighed over a fixed scale, adjusts the car to be weighed with respect to the scale so as to center the rail car to be weighed over the scale. The car stop then fixes the downtrack cars in position. The rail car positioning device then moves the rail cars that are uptrack of the car to be weighed back and forth periodically until stresses from coupled cars in the couplers of the rail car to be weighed are eliminated. These coupler stresses influence the weight of the car, and thereby eliminating them also eliminates the need for decoupling of the rail cars during the weighing and loading processes.

DETAILED DESCRIPTION OF THE INVENTION

Figure 1A:
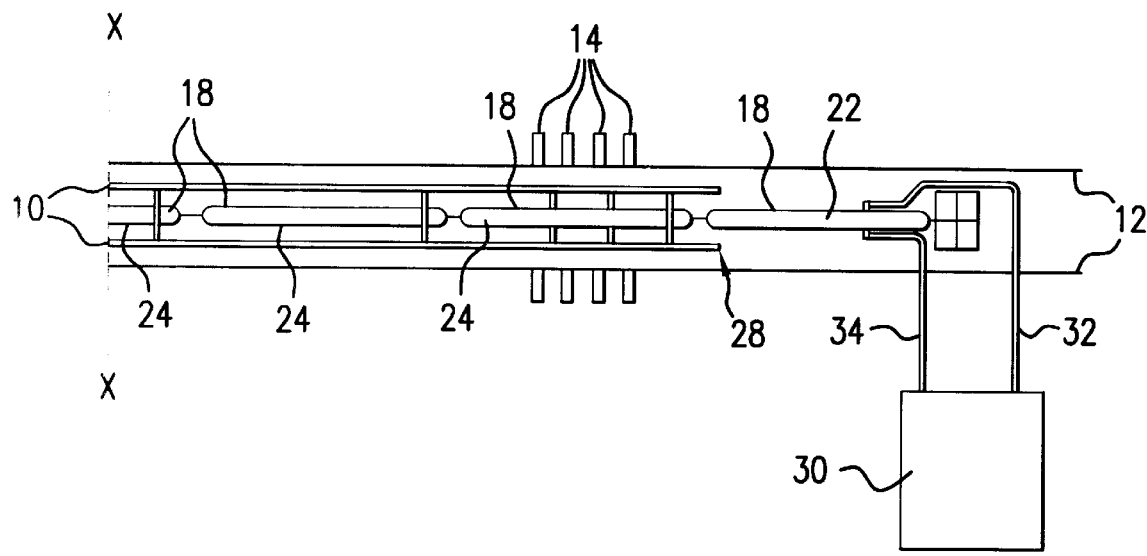
FIG. 1 is a schematic plan view, illustrated in three portions, of the rail car positioning device, with FIGS. 1A, 1B and 1C intended to be aligned at the ends with one another at the match lines X—X and Z—Z, as indicated.

The system useful in the invention comprises a hydraulically operated, reversible rail car positioning device of a kind which is disclosed in U.S. Pat. Nos. 5,150,656 and 5,387,812 to Lobb et al, the disclosures of which are incorporated herein by reference. The rail car positioning device is mounted in a steel guideway or carriage assembly, mounted to the railroad ties and located between the rail tracks. The carriage assembly also includes first and second pusher members, mounted in the carriage assembly which can be elevated to the height of an axle of a rail car. When elevated, the pushers engage the rail car axle. The pushers are retracted into the carriage assembly to allow movement of the rail cars. Thus all components of the carriage assembly are located between the track rails. The pusher members, preferably two forward and two back, can be elevated hydraulically before and behind the axle of an overlying rail car, to engage the axle of the rail car. A set of hydraulically operated cylinders in the carriage assembly elevate and retract the pusher members, and move the carriage assembly back and forth reversibly along the guideway. The carriage assembly is operated by a plurality of hydraulic cylinders and is attached to guide rollers that permit smooth motion of the carriage assembly back and forth.

The system of the invention further comprises a fixed scale mounted downtrack from the rail car positioning device, and a variable position car stop downtrack of the scale. The car stop, also fitted with hydraulic cylinders, can be extended to block the wheels of the car downtrack of the car to be weighed to prevent the car and those coupled to it downtrack from moving forward and to isolate such other cars from the car to be weighed.

The combined portions of FIG. 1, FIGS. 1A, 1B and 1C, illustrate the positioning device and its operation. Referring to these figures, a guideway or parallel track 10 is disposed between two rails 12 of a railroad track, and is rigidly fastened to railroad ties 14.

A series of hydraulic cylinders 18 is disposed between the guideway 10 with their longitudinal axes parallel to and about midway between, the guideway 10. The series of cylinders 18 preferably includes a first cylinder 22, an intermediate cylinder 24 and a last cylinder 26 (see FIG. 1B); however, the number of cylinders may vary.

One end of the guideway 10 is designated as being the reverse travel end 28. A hydraulic power unit 30 is disposed alongside and outside of the rails 12 of the railroad track. The power unit 30 is provided with conventional connections, e.g., hoses 32 and 34, which place them in fluid communication with the first hydraulic cylinder 22. The power unit 30 also includes a motor to drive a fluid pressurizing pump and valves to route the pressurized fluid to either of the connecting hoses 32 and 34. Such power units are commercially available.

Figure 1B:
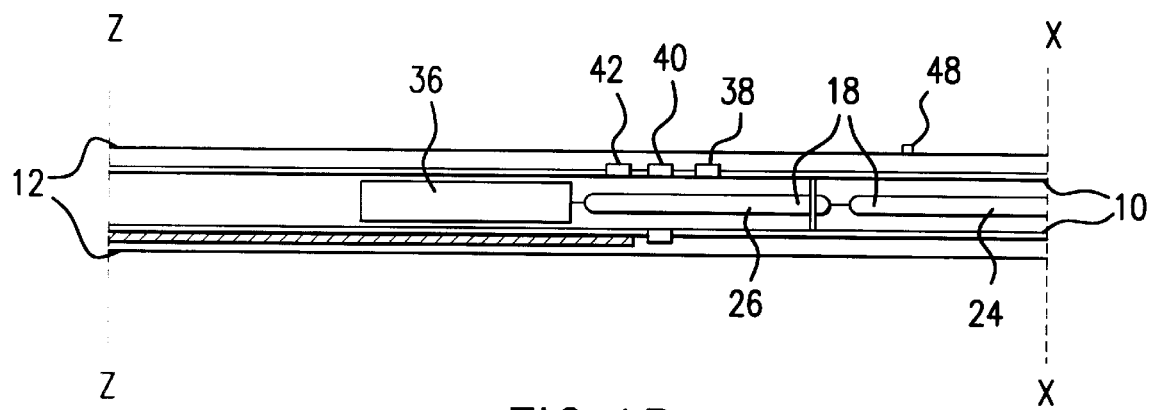
Figure 1C:
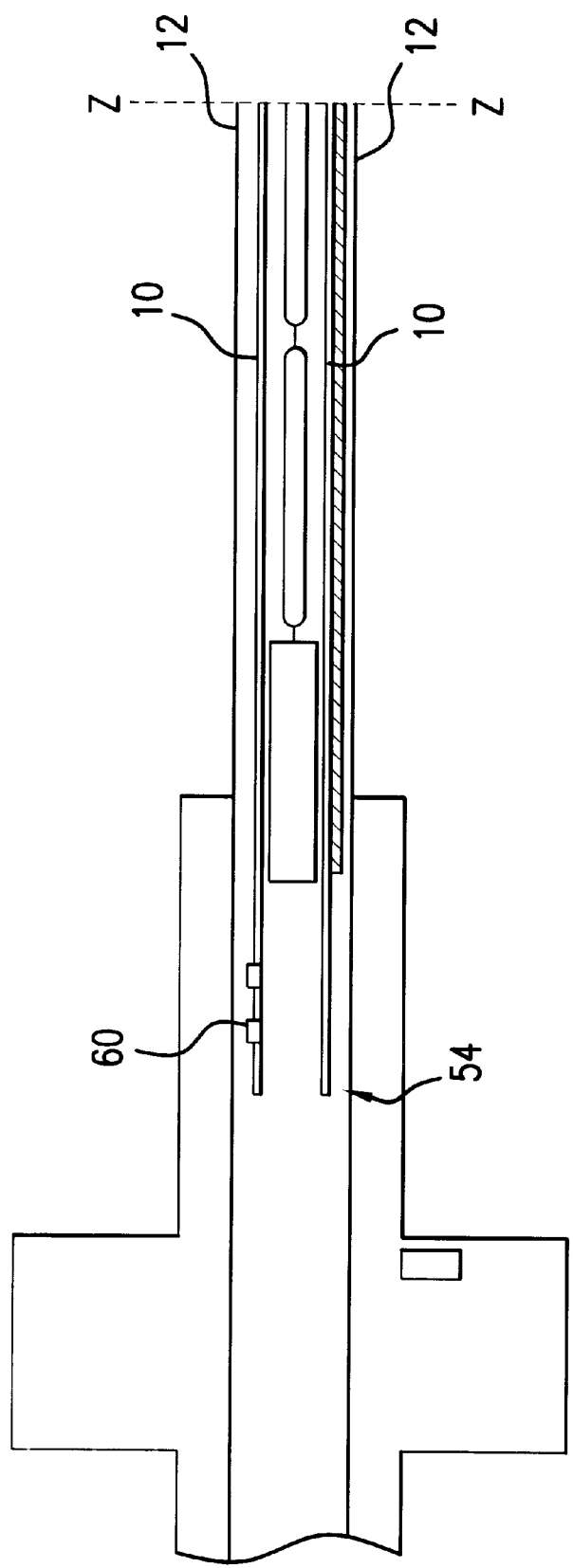

As shown in FIG. 1B, a carriage assembly 36 is connected to the last hydraulic cylinder 26 and is mounted within the guideway 10. The carriage assembly 36 is equipped with wheels (not shown) which ride within recesses within the guide tracks of the guideway 10. Limit switches 38, 40 and 42 limit the travel of the guideway 10 and detect when a wheel traverses the guideway 10. A wheel stop 48, located on one rail 12, is located between the travel ends of the guideway 10. The forward travel end 54 of the guideway (FIG. 1C) is located within an end travel limit switch 60.

Figure 2:
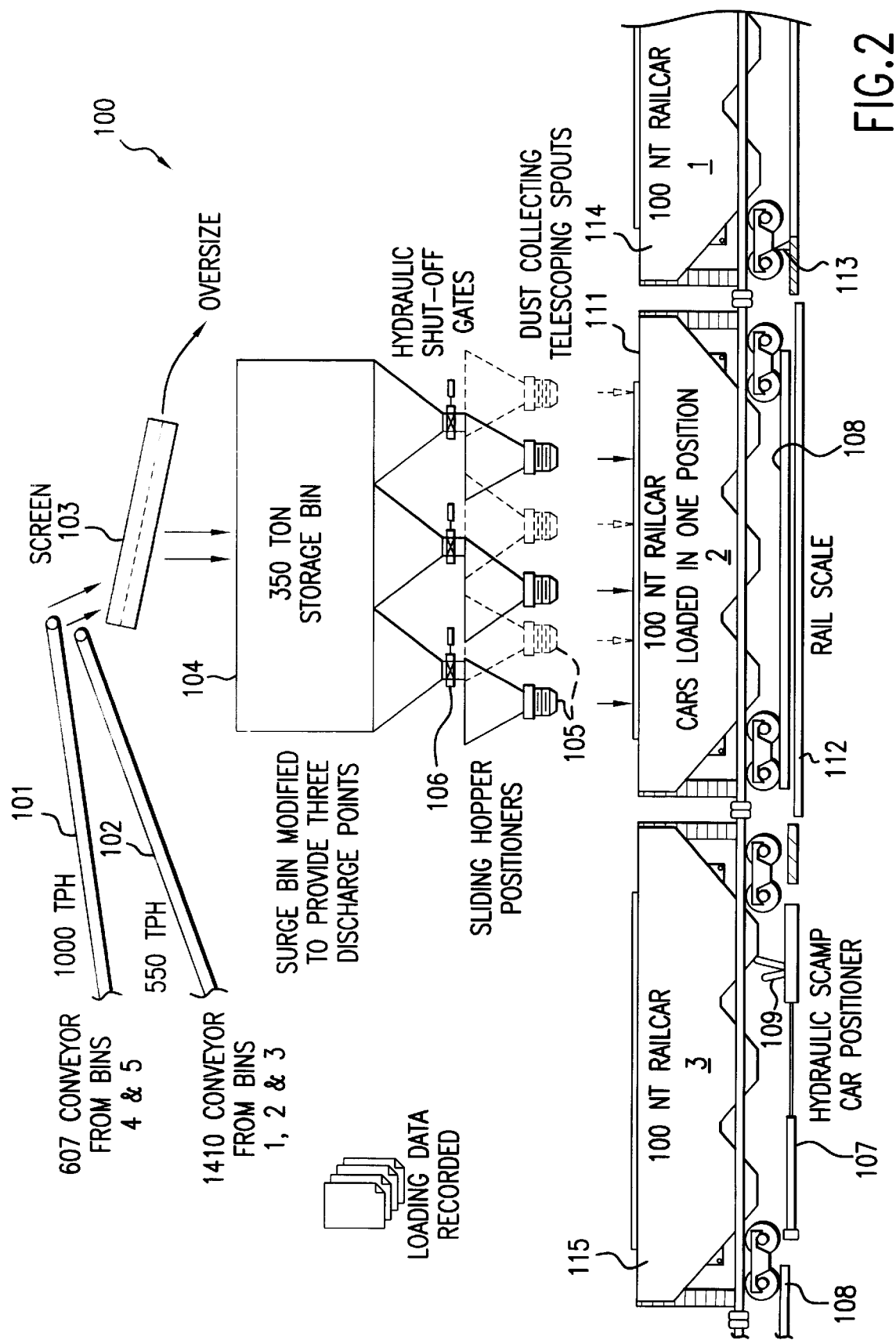
FIG. 2 is a elevational view depicting schematically a loading system useful for loading solid materials into a rail car in accordance with the invention.

The system of the invention further comprises a conventional stationary scale 112, see FIG. 2, mounted downtrack from the guideway 10, and a variable position car stop 113 downtrack of the scale 112. The car stop 113, also fitted with a hydraulic cylinder, (not shown) is extended to block the wheels of the overlying car to prevent the car and cars coupled to it downtrack from moving, and to isolate the downtrack car from the car to be weighed.

In operation, in accordance with the present rail car loading method, a string of empty rail cars is pushed uptrack with an engine so that most of the empty cars are uptrack of the fixed scale 112. The starting position for loading the string is found when the first car of the string, coupled to the engine, is positioned over the car stop 113; the second car is positioned over the scale 112 and the third car is positioned over the hydraulically operated carriage assembly 36 set into the rail tracks 10. The carriage assembly 36, with its retractable pushers attached to the third car, is slowly moved forward or backward, as required, so that the second car can be centered over the scale. In this way, the string of rail cars can be safely and accurately moved in either the forward or reverse direction. The carriage assembly is capable of moving the string of cars to position the car to be weighed to within a tolerance of one inch of the center of the scale.

At that point, the variable position car stop 113 downtrack of the scale is extended by means of a hydraulically operated ram, to block the wheels of the first car downtrack of the scale. This car stop prevents all downtrack rail cars and the engine from moving in either direction. Thus the car stop effectively isolates the car to be weighed on the scale from the rest of the coupled rail cars downtrack.

The carriage assembly 36, still attached to the third car, is used to move the uptrack string of cars back and forth along the track until stresses caused by coupling to adjacent cars that can affect the accuracy of weighing are eliminated. The weight of the unloaded car to be weighed is then taken. This car is then loaded until a preselected amount of cargo material has been added to the car. The back and forth movement is then repeated before a weight ticket is printed. Throughout this loading process, the string of cars downtrack from the scale is immobilized by the car stop, and the string of cars uptrack from the scale are immobilized by the carriage assembly device 36, thus isolating the car being weighed on the scale from coupling influences. The back and forth movement of the uptrack cars by the carriage assembly 36 can be repeated as desired from time to time, to further assure that coupling stresses are eliminated at all times. Changes in the timing of this stress relief may be desirable due to variations in temperature and climate with time.

When the car on the scale 112 has been filled, the car stop 113 is retracted, so that the entire string of cars is held by the carriage assembly 36 attached to the car uptrack of the scale. The carriage assembly 36 moves the entire string of cars downtrack by one car length until the car it is holding is centered over the scale 112. The car stop 113 is then deployed to hold the just-filled car, which is now positioned downtrack of the scale. The entire string of cars is now held by the car stop 113. The carriage assembly 36 then releases the car it is attached to, and the carriage assembly 36 is moved uptrack to the car uptrack of the scale 112, and is connected to that car by means of the pushers. The cycle is then repeated until all of the cars uptrack of the scale 112 have been filled.

The combination of the rail car positioning device and the car stop at either side of the scale prevents the car being weighed from moving, and isolates this car during loading to prevent the coupled cars, either uptrack or downtrack, from influencing the measured weight. This in turn means that the track does not have to be level along the length of the train.

Using this combination of the invention of the car positioning device, the car stop, and back and forth movements to relieve coupling stresses, rail cars can be weighed within 0.2% accuracy, despite being coupled on a non-level track.

The carriage assembly and car stop are operated by control circuitry from a remote location. A remote control panel is used to start and stop motion of the carriage assembly, and to extend and retract the pushers. Since the control panel detects axles rather than the beginning and end of the rail car, the positioning device automatically adjusts for differing lengths of rail cars. When the pushers are in their extended position, a lock bar in the carriage assembly is raised, locking the pushers in place. When the rail car string is to be moved forward, the above procedure is reversed.

The variable speed hydraulic drive and cylinders permits controlled acceleration of the rail car. The hydraulic cylinders and carriage run between guide rollers mounted to the railroad ties, and no special equipment or under track trenches are required. When the pushers are retracted, the whole of the carriage assembly is located between the rails and below the level of the undercarriage of the rail car, thus allowing a free travel of the rail cars, without interference, over the weighing system of the invention.

Automated control and monitoring is designed and used to extend and retract the pushers to attach to the axle of a rail car and to accurately position the rail car over the scale. The control system must be able to extend the pushers so that they attach accurately to the rail car axle; must reversibly move the rail car to be weighed so that it can be centered over the scale without tension from coupled rail cars on either side of the car being weighed; must then engage the rail car stop; and, after the rail car is loaded, must disengage the stop so that the next coupled rail car can be moved forward over the scale. The control system must also be able to detect when the last coupled car has been centered over the scale.

In order to provide complete automation for weighing the rail cars before and after they are loaded, the control system is programmed to take into account the average length and weight of the rail cars, and to then accurately position and weigh each individual rail car during the loading process. Improved weight accuracy thus can be obtained without decoupling the rail cars or building a level, parallel track to eliminate the influence of coupled, adjoining cars on the measured weight.

In particular, the present method can be employed to load powdered material from overhead bins into a top loading rail car, as shown for example in FIG. 2. Referring to FIG. 2, a suitable weighing system 100 comprises conveyors 101 and 102 capable of passing 1000 tons per hour and 550 tons per hour respectively of powdered material through a screen 103, fitted so that oversize material can be removed, and onto an overhead storage bin 104. The storage bin 104 is fitted with a plurality of sliding hoppers 105. A plurality of shut-off gates 106 open and close the hoppers 105.

A reversible hydraulic car positioning device 107, as described with respect to FIG. 1, is mounted inside the rail car tracks 108. Retractable pushers 109 are used to engage the axle (not shown) of the rail car 115 so that the car 111 to be weighed can be centered into position above the scale 112. At that point the hydraulically operated car stop 113 engages the downtrack loaded car 114 to prevent its movement and movement of cars coupled to it downtrack. The car 115 and cars coupled to it uptrack is then moved by the car positioning device 107 back and forth to relieve any coupling stresses on the coupled car 111 to be weighed. After weighing the empty rail car 111, the shut off gates 106 and the sliding hoppers 105 are opened and the powdered material from the storage bin 104 begins to fill the car. When the preprogrammed weight of the car 111 and the powdered material is reached, the gates 106 and the hoppers 105 are closed; the back and forth movement of car 115 is repeated; a weigh ticket is printed; and the car stop 113 is retracted. The filled rail car 111 is moved forward by the positioning device 107 and the succeeding rail car 115 to be filled is moved into position over the scale 112. The cycle is then repeated.

The present method is useful to center a rail car over a fixed scale mounted on a section of rail track. A string of cars, generally up to 20 or 25 cars, is drawn down the track. If the track slopes downhill, the string of cars tends to roll downhill if no restraints, e.g., the pushers 109 and the car stop 113, are not in place.

In accordance with the present rail car loading method, a string of empty cars is pushed uptrack with an engine so that the second car to be loaded 115 is positioned over the rail car positioning device 107 and the car to be loaded 111 is centered over the fixed scale 112. The car 114 coupled to the engine is positioned over the car stop 113. The car stop 113 is then raised to engage the wheels of the car 114 downtrack of the car 111 to be weighed. The engine is then put in neutral and the brakes are released. The car 115 is then moved back and forth to exactly center the car 111 over the scale. The car 115 is then moved back and forth by the car positioning device 107 to relieve coupling stresses.

After weighing the empty car 111, the car is loaded as shown in FIG. 2. The uptrack car 115 is inspected and sealed while car 111 is being loaded. After loading of the car 111 is complete, the car stop 113 is retracted, the filled car 111 is moved forward by the car positioning device 107 and the next car to be filled 115 is moved into position over the scale 112. The car stop 113 is elevated to attach to the wheels of the filled car 111, and the pushers 109 are retracted. The car positioning device 107 is moved uptrack and the pushers 109 are extended to engage the axle of the next car of the string, now uptrack of the car to be weighed. The first loaded car 111 is inspected and sealed. This cycle is repeated until all of the cars in the string have been inspected, weighed, loaded and moved forward. The engine then brings the string of cars down the track to a storage area. The engine and car 114, which is never loaded, are uncoupled and shunted to retrieve another string of empty cars.

The combination of the hydraulic carriage assembly and the pushers at one side of the scale, which isolates the car being weighed from up track coupled cars, the car stop at the other end of the scale, which isolates the car being weighed from down track coupled cars, and the periodic movement of uptrack cars by the rail car positioning device prevents the cars on either side of the rail car being weighed and loaded from influencing the weight of the car over the stationary scale, even when the tracks are not level at either end.

Although the invention has been described in terms of particular embodiments, one skilled in the art will recognize that various changes to the equipment used and the sequence of steps for weighing and loading cars can be made, and are meant to be included herein. Although the system has been exemplified as filling rail cars with solid material, liquid cargo can be used to fill rail tank cars as well. The invention is only to be limited by the scope of the appended claims.

We claim:

1. An apparatus for weighing a rail car of a train on a railroad track and while the car is coupled to at least two other rail cars without decoupling the cars comprising a rail car positioning apparatus for positioning the rail car to be weighed and centering said car over a scale, and holding the cars contiguous to the car to be weighed from movement, said rail car having an axle member spaced along a longitude axis of the rail cars, the axle member being provided with wheels on the opposing ends thereof, each axle member being disposed at a given height, said rail car positioning apparatus comprising:

a carriage assembly;

first and second opposed retractable pusher members mounted on said carriage assembly;

means for selectively extending said first and second retractable pusher members to at least the height of the axle member of the rail car for engaging the axle member of the rail car in forward or reverse directions;

displacement means comprising a plurality of hydraulic cylinders, at least one of said hydraulic cylinders being in series with another of said hydraulic cylinders for displacing said carriage assembly in a direction parallel to the longitude axis of the rail car and for exerting a force between said pusher members and the axle member of the rail car for moving the rail car and those coupled to it back and forth to center the car to be weighed over a scale and to relieve coupling stresses from said car;

a fixed scale mounted between the rails downtrack of the rail car positioning apparatus, and an rail car stop to prevent movement of all coupled cars downtrack of the scale when the car to be weighed has been centered on said scale and allow movement of the cars uptrack of the car to be weighed, by the car positioning apparatus, to free said car of coupling stresses from contiguous railcars.

2. An apparatus according to claim 1 wherein said carriage assembly is mounted between two railroad tracks.

3. An apparatus according to claim 1 wherein said rail car stop is fitted with a hydraulic cylinder that raises the stop in front of a set of wheels of said downtrack coupled rail car.

4. An apparatus according to claim 3 wherein the hydraulic cylinder raises the car stop in front of the rear wheels of said downtrack coupled rail car.

5. A method of positioning a rail car coupled to other rail cars along a set of tracks, wherein a scale is mounted between said tracks for weighing said rail car comprising providing a carriage assembly between said tracks uptrack of said scale, said carriage assembly including at least two opposing pusher members and a hydraulic cylinders for extending said pusher members to the axle height of an uptrack rail car and for retracting said pusher members into said carriage assembly;

providing a plurality of hydraulic cylinders having an axially aligned piston rod in said carriage assembly for selectively moving the carriage assembly back and forth along said rail tracks so that said pusher members, when in their extended position, can move a coupled rail car uptrack of the car to be weighed forward and backward a selected distance to relive stresses from cars coupled to the rail car to be weighed;

providing a car stop to prevent one or more coupled cars downtrack of the rail car to be weighed from moving along said rail tracks; and moving said rail car by means of the carriage assembly back and forth to center the rail car over the scale and periodically from time to time to relieve stresses generated in the couplings uptrack and downtrack of said car and by means of said car stop preventing movement of the coupled cars.

6. A method according to claim 5 wherein said rail car is weighed by said scale prior to and after loading said car with cargo material.

7. A method according to claim 6 wherein after loading said car with cargo material, the car stop is retracted, said carriage assembly is moved forward one car length to move the loaded car along the track, the car stop engages the loaded car and said carriage assembly is moved uptrack into position beneath the next uptrack rail car, the opposed pusher members are engaged and the steps of claim 5 are repeated.

8. A method according to claim 6 including the step of extending said opposed pusher members so as to engage an axle of said uptrack rail car;

moving said carriage assembly back and forth to center the second rail car to be weighed over said scale and from time to time to relieve stresses of the couplers between the rail car to be weighed and an uptrack and a downtrack rail car; and weighing said second rail car.

9. A method according to claim 8 wherein, after the rail car has been weighed, loading said rail car with a cargo material to a predetermined weight of the car and its cargo;

moving the uptrack rail car back and forth to relieve coupling stresses, retracting said car stop and moving the loaded car forward one car length.

10. A method of weighing sequentially coupled rail cars along a set of tracks fitted with a) a carriage assembly mounted in a guideway including a set of tracks, at least one set of opposing pusher members mounted in said carriage assembly and means for extending said pusher members to grip an axle of one of said cars, said carriage assembly further including a hydraulic cylinder for extending and retracting said pusher members and a plurality of hydraulic cylinders disposed parallel to said set of tracks for moving said carriage assembly forward and backward along said tracks;

b) a scale mounted downtrack of said carriage assembly for weighing a rail car; and c) a car stop mounted downtrack of said scale for engaging one or more wheels of a downtrack rail car and preventing it and other coupled downtrack cars from moving along said tracks; said method comprising the steps of:

moving a rail car to be weighed coupled to other rail cars along the tracks into a position over said scale;

extending said opposed pusher members so as to engage an axle of a rail car uptrack from the rail car to be weighed;

moving said carriage assembly back and forth to center said rail car to be weighed over said scale and from time to time to relieve stresses of the couplers between the rail car to be weighed and a downtrack and an uptrack rail car;

extending said car stop to engage one set of wheels of the car downtrack of the car to be weighed; and weighing said rail car.

11. A method according to claim 10 wherein after the rail car has been weighed, loading said rail car with a cargo material to a predetermined weight of the car and its cargo;

retracting said car stop and moving the loaded car downtrack one car length by means of said carriage assembly.

* * * * *